May 10, 1960 J. A. ARMSTRONG ET AL 2,936,043
CYCLONIC DUST COLLECTOR
Filed Jan. 9, 1957 3 Sheets-Sheet 2
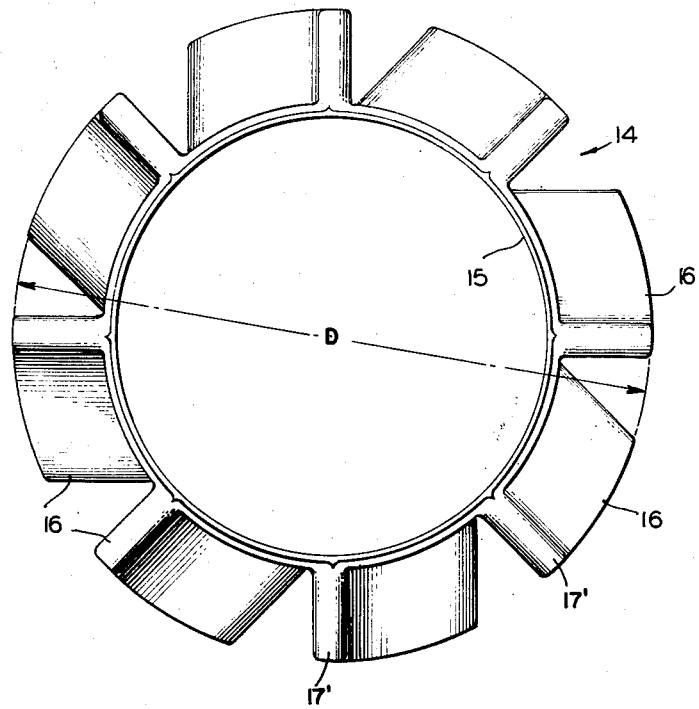
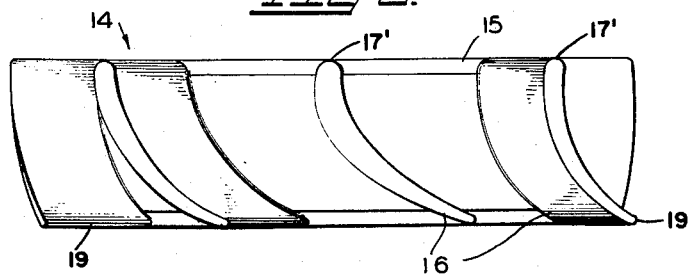
INVENTOR
JOHN A. ARMSTRONG
ALAN B. WALKER
BY
ATTORNEYS

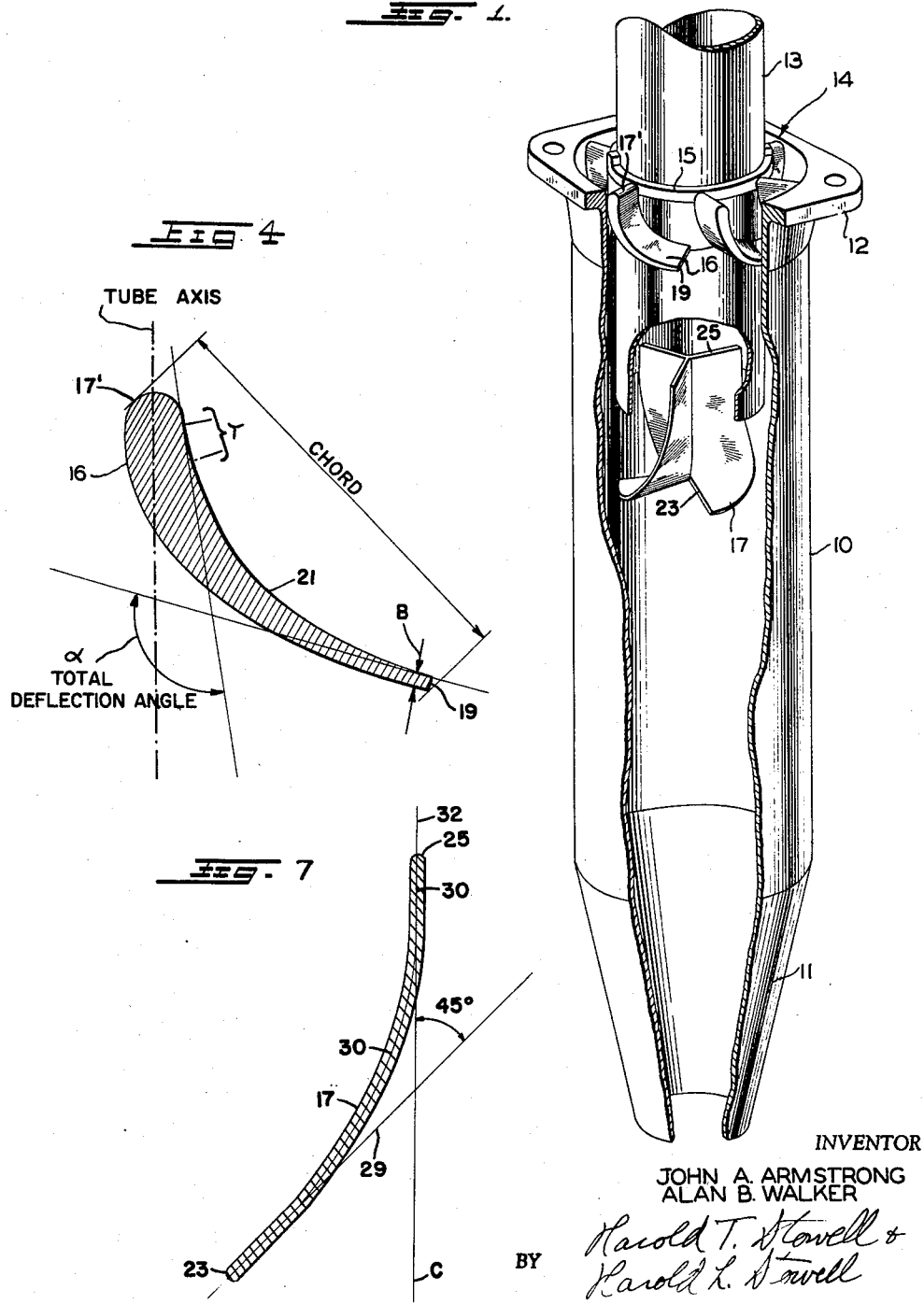

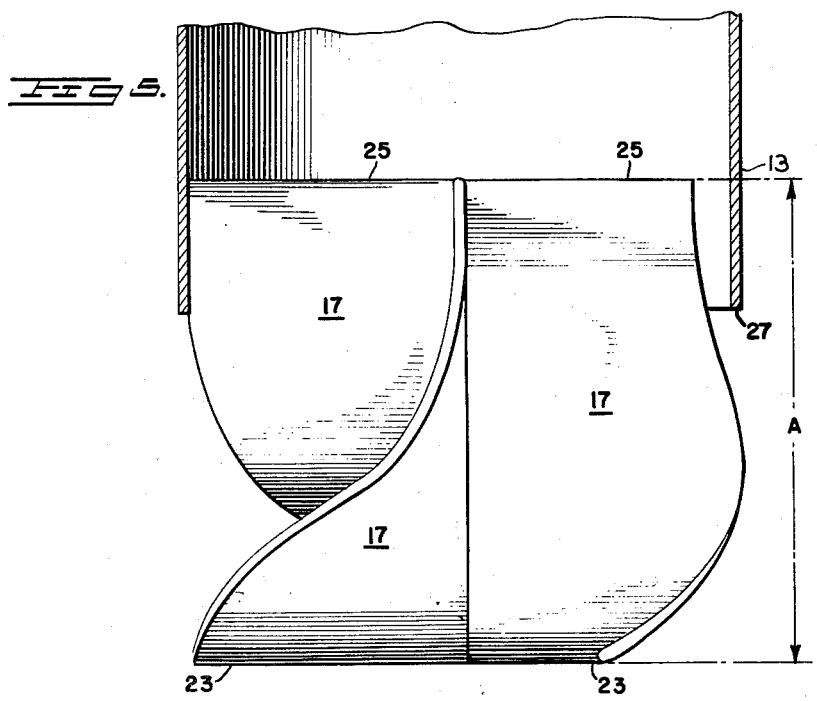
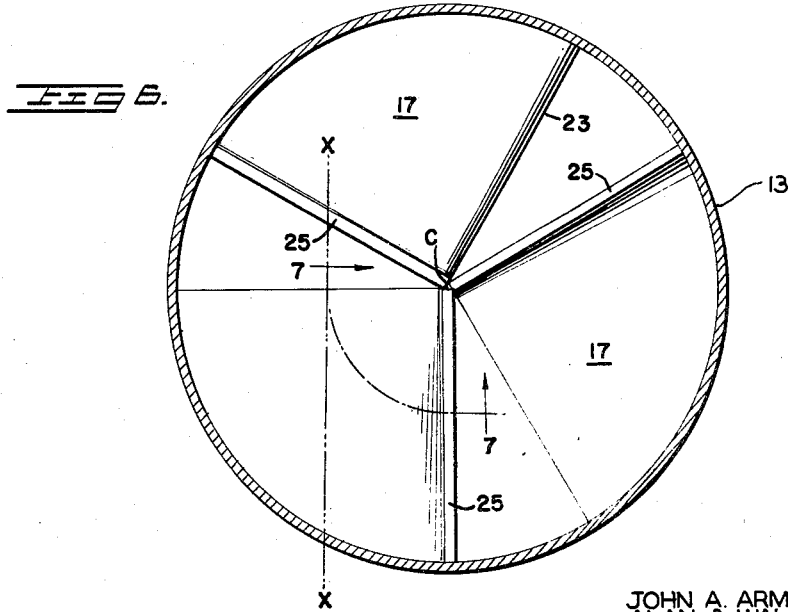

2,936,043
CYCLONIC DUST COLLECTOR

John A. Armstrong, Plainfield, and Alan B. Walker, Bound Brook, N.J., assignors to Research-Cottrell, Inc., Bridgewater Township, Somerset County, N.J., a corporation of New Jersey Application January 9, 1957, Serial No. 633,359

7 Claims. (Cl. 183—92)

This invention relates to improved forms of cyclonic dust collectors and particularly to cyclonic dust collectors of the vane-inlet type having substantially increased dust removal efficiency without a corresponding increase in the energy required to pass the gas to be cleaned through the collector.

The recent trend in the design of vane type cyclonic collectors has been to attempt to obtain increased dust removal efficiencies by decreasing the diameters of the collector tubes in order to take advantage of the increased centrifugal force on the entrained dust particles by reducing the radius of rotation of the gas in the tubes. This approach not only greatly increases the cost of construction for a given capacity but is limited by practical considerations such as tube plugging.

We have found that by the provision of aerodynamically shaped arcuate inlet vanes to increase the tangential velocity of the gas in the collector tubes together with helical recovery vanes at the entrance to the outlet tube to reconvert rotational kinetic energy of the cleaned gases to rectilinear kinetic energy, substantially higher cleaning efficiencies may be obtained without any substantial increase in energy requirements for tubes of corresponding sizes, and collection efficiencies may be obtained which would normally require the use of collector tubes of half the size or less than those used in the collectors of the invention. For example, high efficiencies of the order of those now normally obtained with 9-inch diameter tubes may be obtained with tubes 16 to 24 inches in diameter.

The cyclonic dust collector of the invention comprises a cylindrical collector tube, an outlet tube concentrically positioned in the upper portion of the collector tube and defining therewith an annular separating chamber, not less than seven aerodynamically shaped arcuate vanes positioned in the inlet to the separating chamber adjacent the upper end of the collector tube and a plurality of helical recovery vanes positioned at the lower end of the outlet tube. The dust collector may be used either singly or in multiple depending on the volume of gas to be cleaned.

The principles of the invention and the preferred constructional features thereof will be more fully explained and described with reference to the accompanying drawings in which:

Fig. 1 is a perspective view with parts broken away of a dust collector embodying the principles of the invention;

Fig. 2 is a plan view and Fig. 3 is a side elevation of an arcuate inlet vane assembly embodying the principles of the invention;

Fig. 4 is a median section through a typical inlet vane of the invention;

Fig. 5 is a side elevation of a recovery vane assembly in association with the inlet end of the outlet tube of the dust collector of the invention.

Fig. 6 is a top plan view of the recovery vane assembly shown in Fig. 5; and

Fig. 7 is a true section 7—7 rotated into plane x—x of Fig. 6 on a radius having a length equal to 0.153 D of the collector tube.

Referring more particularly to Fig. 1, 10 is a collector tube having a tapered dust outlet 11 at the lower end thereof and a supporting flange 12 at its upper end. Concentrically positioned in the upper end of the collector tube is the outlet tube 13. Arcuate inlet vane assembly 14, comprising a collar 15 and arcuate vanes 16, shown in larger scale in Figs. 2 and 3, is positioned at the inlet end of the annular separating space between the collector tube 10 and the outlet tube 13. Recovery vane assembly 17, shown in larger scale in Figs. 5 and 6 is positioned at the lower or inlet end of outlet tube 13.

The characteristic feature of the inlet vane assembly is the radially disposed vanes 16 which may be supported by an internal collar as shown, or by an external collar, or both, or in any other desired manner. It is the aerodynamic shape of the vanes 16 which produces the desired high tangential gas velocities in the annular separating chamber between the collector tube and the outlet tube. The critical parameters of the vane construction may be defined as follows with particular reference to Fig. 4.

The vane has a ratio of maximum T to minimum B foil thickness of from about 4.0 to about 6.0, preferably about 6.0. It has its maximum thickness T located at from 10 to 18.5% of the chord length from the leading edge 17' of the vane, preferably at about 11% thereof. Its total deflection angle, defined as the angle between the tangents to the leading and trailing edges 17' and 19 of the upstream face 21 of the vane, is in the range of about 105° to 115°, preferably about 115°.

The vanes are so positioned in the inlet entrance to the separating chamber that the line tangent to the upstream face 21 at the trailing edge of the vane is at an angle of from about 95° to about 105° with the parallel projection of the tube axis.

The number of vanes in the inlet vane assembly is at least seven and may be varied from seven up to a maximum defined by the relation $n = 1.4\ D/T$ wherein $n$ is the number of blades, D is the collector tube diameter and T is the maximum blade thickness. Within this range the number of blades may be selected with respect to the desired relationship between collector flow capacity at a given pressure drop and dust collection efficiency. Within the designated range collection efficiency increases with increasing number of vanes while the collector capacity at a given pressure drop decreases.

The outlet vane assembly, Figs. 5 and 6, comprises a plurality, typically three, helically-shaped vanes 17, equally spaced about the axis of the outlet tube 13, every element of the vanes being radial to and intersecting at the axis C, Fig. 6, of the outlet tube. The angle of a line 29 with respect to the tube axis C is from about 40° to 50° and preferably about 45°. Line 29 is a straight line which is tangent, at the leading edge 23 of vane 17, to a line 30 extending centrally through an edge of the vane 17 measured on a radius R, 0.153 D of the collector tube. The angle of a line 32 with respect to the tube axis C is zero. Line 32 is tangent to line 30 at the trailing edge 25 of the vane 17. The axial length A of the outlet vane asembly is in the range of about 0.50 D to 0.70 D, preferably about 0.50 D. An important factor is the positioning of the outlet vane assembly with the leading edges 23 of the vanes from about 0.30 D to about 0.40 D below the inlet edge 27 of the outlet tube 13. This position reduces the entry losses of the gases entering the outlet tube and by its effect on the tangential velocity patterns in the lower portion of the separator tube makes it possible to effect a substantial shortening of the separator tube.

In a typical dust collector embodying the principles of the invention, the length of the collector tube may be 4.3 D (D being the inside diameter of the collector tube) with a tapered dust outlet portion 11, 1.3 D in length and tapering to a dust outlet 0.45 D in diameter.

The outlet tube may be 0.67 D in diameter and project 1.05 D into the upper end of the collector tube.

The preferred collector tube length may be defined as the ratio of the distance between the lower end of the gas outlet tube and the dust outlet to the inside diameter of the collector tube. This ratio may range from about 1.95 to about 3.25 and is preferably about 1.95.

The improved cyclonic dust collector of the invention may be varied in design and construction within the ranges described and explained above to adapt the collector to a wide variety of industrial gas cleaning problems while maintaining high collection efficiencies with minimum energy requirements.

We claim:

1. A reverse gas flow cyclonic dust collector comprising a cylindrical collector tube, an outlet tube concentrically positioned in the inlet portion of the collector tube and defining therewith an annular separating chamber, not less than seven aerodynamically-shaped arcuate vanes having a maximum foil thickness from about 4 to about 6 times the minimum foil thickness positioned in the inlet to the separating chamber adjacent the inlet end of the collector tube, the maximum foil thickness of the inlet vanes being located at from about 10% to about 18.5% of the chord length from the leading edge of the vanes, and a plurality of helical recovery vanes positioned at the inlet end of the outlet tube.

2. A reverse gas flow cyclonic dust collector comprising a cylindrical collector tube, an outlet tube concentrically positioned in the inlet portion of the collector tube and defining therewith an annular separating chamber, not less than seven aerodynamically-shaped arcuate vanes having a maximum foil thickness of from about 4 to 6 times the minimum foil thickness positioned in the inlet to the separating chamber adjacent the inlet end of the collector tube, the angle between the tangents to the leading and trailing edges of the upstream faces of the inlet vanes being from about 105° to about 115°, and a plurality of helical recovery vanes positioned at the inlet end of the outlet tube.

3. A reverse gas flow cyclonic dust collector comprising a cylindrical collector tube, an outlet tube concentrically positioned in the inlet portion of the collector tube and defining therewith an annular separating chamber, not less than seven aerodynamically-shaped arcuate vanes having a maximum foil thickness of from about 4 to about 6 times the minimum foil thickness positioned in the inlet to the separating chamber adjacent the inlet end of the collector tube, the inlet vanes being positioned with the tangent to the trailing edge of the upstream faces of the vanes at an angle of from about 95° to about 105° to the tube axis, and a plurality of helical recovery vanes positioned at the inlet end of the outlet tube.

4. A reverse gas flow cyclonic dust collector comprising a cylindrical collector tube, an outlet tube concentrically positioned in the inlet portion of the collector tube and defining therewith an annular separating chamber, not less than seven aerodynamically-shaped arcuate vanes having a maximum foil thickness of from about 4 to about 6 times the minimum foil thickness positioned in the inlet to the separating chamber adjacent the inlet end of the collector tube, the number of inlet vanes being not less than seven and not more than 1.4 $D/T$ wherein D is the inside diameter of the collector tube and T is the maximum blade thickness, and a plurality of helical recovery vanes positioned at the inlet end of the outlet tube.

5. A reverse gas flow cyclonic dust collector comprising a cylindrical collector tube, an outlet tube concentrically positioned in the inlet portion of the collector tube and defining therewith an annular separating chamber, not less than seven aerodynamically-shaped arcuate vanes having a maximum foil thickness of from about 4 to about 6 times the minimum foil thickness positioned in the inlet to the separating chamber adjacent the inlet end of the collector tube, the inlet vanes being located at from about 10% to about 18.5% of the chord length from the leading edge of the vanes, the angle between the tangents to the leading and trailing edges of the upstream faces of the vanes being from about 105° to about 115°, and the vanes being positioned with tangent to the trailing edge of the upstream faces of the vanes at an angle of from about 95° to about 105° to the tube axis, and a plurality of helical recovery vanes positioned at the inlet end of the outlet tube.

6. A reverse gas flow cyclonic dust collector comprising a cylindrical collector tube, an outlet tube concentrically positioned in the inlet portion of the collector tube and defining therewith an annular separating chamber, not less than seven aerodynamically-shaped arcuate vanes having a maximum foil thickness from about 4 to about 6 times the minimum foil thickness positioned in the inlet to the separating chamber adjacent the inlet end of the collector tube, the maximum foil thickness of the inlet vanes being located at from about 10% to about 18.5% of the chord length from the leading edge of the vanes, and a plurality of helical recovery vanes positioned at the inlet end of the outlet tube and projecting from the lower end of the outlet tube a distance of from about 0.3 to about 0.4 times the inner diameter of the collector tube.

7. A reverse gas flow cyclonic dust collector comprising a cylindrical collector tube, an outlet tube concentrically positioned in the inlet portion of the collector tube and defining therewith an annular separating chamber, not less than seven aerodynamically-shaped arcuate vanes having a maximum foil thickness from about 4 to about 6 times the minimum foil thickness positioned in the inlet to the separating chamber adjacent the inlet end of the collector tube, the maximum foil thickness of the inlet vanes being located at from about 10% to about 18.5% of the chord length from the leading edge of the vanes, and a plurality of helical recovery vanes positioned at the inlet end of the outlet tube and projecting from the lower end of the outlet tube a distance of from about 0.3 to about 0.4 times the inner diameter of the collector tube, the leading edges of the helical recovery vanes being at an angle of from about 40° to about 50° to the tube axis at a radius of 0.1530 D and the trailing edges of the said vanes being at an angle of about zero with the tube axis.

References Cited in the file of this patent

UNITED STATES PATENTS

| 1,723,427 | Kamrath | Aug. 6, 1929 |
| 2,506,298 | Griffen | May 2, 1950 |
| 2,731,102 | James | Jan. 17, 1956 |
| 2,771,157 | Gustavsson | Nov. 20, 1956 |

FOREIGN PATENTS

| 475,097 | Italy | Oct. 10, 1952 |
| 1,069,071 | France | Feb. 10, 1954 |
| 1,074,255 | France | Mar. 31, 1954 |
| 914,701 | Germany | July 8, 1954 |